US005151228A

United States Patent [19]

Vahlbrauk

[11] Patent Number: 5,151,228

[45] Date of Patent: Sep. 29, 1992

[54] PROCESS FOR MANUFACTURING LARGE-SIZE POROUS SHAPED BODIES OF LOW DENSITY BY SWELLING

[75] Inventor: Wolfgang Vahlbrauk, Bad Gandersheim, Fed. Rep. of Germany

[73] Assignee: Loro-Holding K.H. Vahlbrauk KG, Bad Gandersheim, Fed. Rep. of Germany

[21] Appl. No.: 529,234

[22] Filed: May 25, 1990

[30] Foreign Application Priority Data

May 27, 1989 [DE] Fed. Rep. of Germany ....... 3917282

[51] Int. Cl.[5] ........................ B29C 65/00; C04B 40/00

[52] U.S. Cl. ........................................ 264/42; 264/82; 264/284

[58] Field of Search ...................... 264/42, 43, 82, 284

[56] References Cited

U.S. PATENT DOCUMENTS 3,673,290 6/1972 Brubaker et al. ..................... 264/42

4,822,541 4/1989 Nagai et al. .......................... 264/42

*Primary Examiner*—James Lowe

*Assistant Examiner*—Christopher A. Fiorilla

*Attorney, Agent, or Firm*—Michael J. Striker

[57] ABSTRACT

In order to manufacture large-size porous shaped bodies of low density by swelling clay masses by supplying heat thereto, a plate-like, self-supporting clay mass is used, it is given an all-round support by direct acting, multiple linear solid body contact and at the same time maintained in constant motion relative to the support, and the surface of the swelling clay mass is subjected to constant oxidation by the supply of oxidizing hot gases to the surfaces of the plate-like moving clay mass.

5 Claims, 1 Drawing Sheet

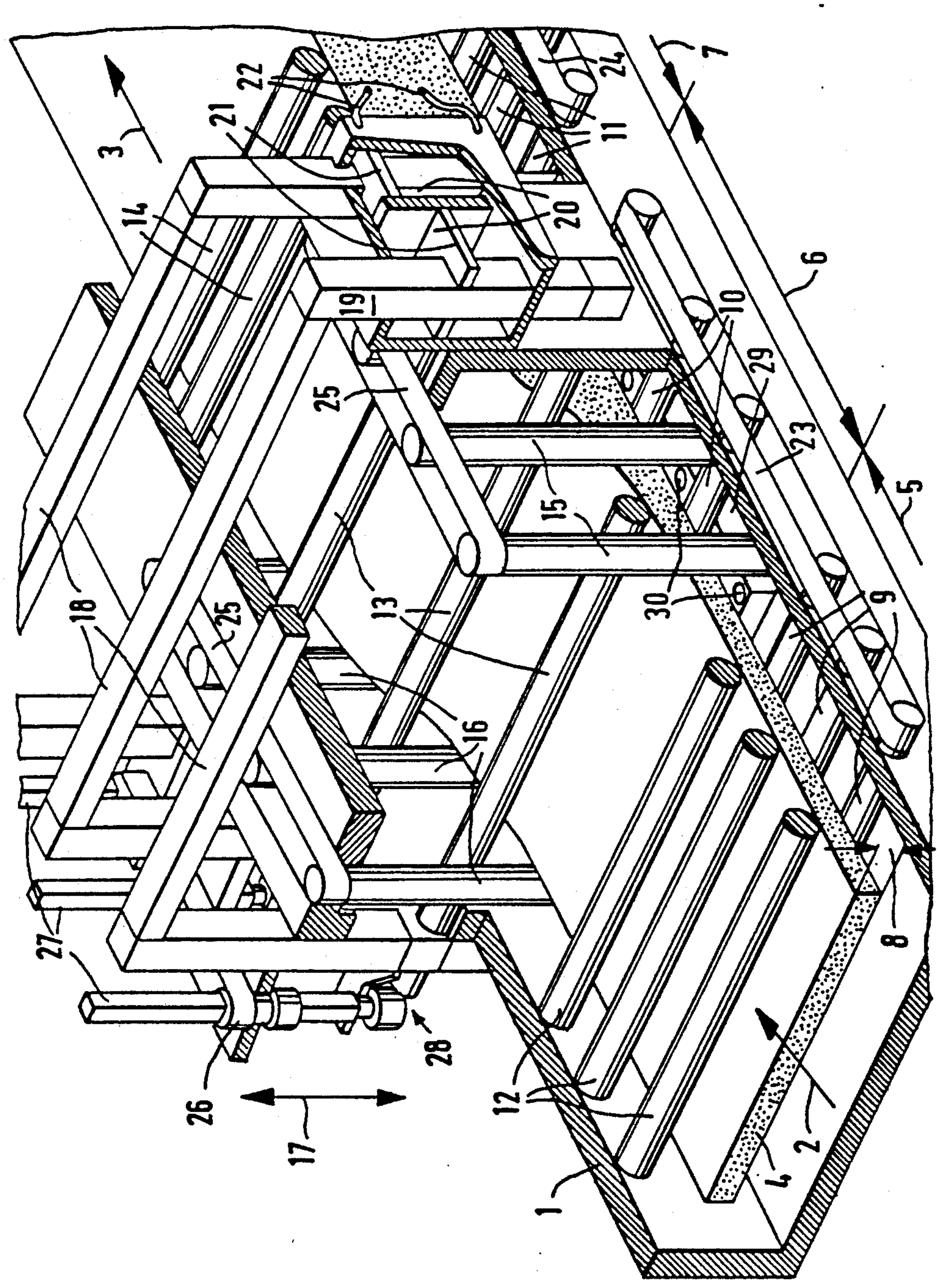
1
2
3
4
5
6
7
8
9
10
11
12
13
14
15
16
17
18
19
20
21
22
23
24
25
26
27
28
29
30

PROCESS FOR MANUFACTURING LARGE-SIZE POROUS SHAPED BODIES OF LOW DENSITY BY SWELLING

BACKGROUND OF THE INVENTION

The present invention relates to a process for manufacturing large-size porous shaped bodies of low density by swelling clay masses by supplying heat thereto.

More particularly, the present invention deals with a process for the thermal, chemical and mechanical treatment of a clay-mineral mass in which a ceramification and reduction of the density of the mass is accomplished by swelling, in order to manufacture large-size cellular ceramic structural elements, e.g. multi-story high wall elements having a low weight. Basalts, pearlites, shales and clays can principally be considered as appropriate for the mass.

It has been proposed to insert preformed clay masses in the final outer dimensions of the shaped body and to swell the body exclusively with the aid of a device from below without any further outside assistance from any device, whereby the clay mass is intended to swell into the inner free spaces of the clay mass. Thus, it is proposed in German Patent 22 16 463 that clay masses preformed in an ingot mold be swollen on furnace carriages in a double-tunnel furnace. In DE-OS 36 35 672 and DE-OS 36 21 845 Al it has been proposed that shaped bodies with channels drawn through them be baked in a rapid-burning bogie hearth furnace and that the channels of the shaped body be filled by swelling. If a clay mass preformed according to the dimensions of the final shaped body is used, the heating of the clay mass to the temperature which is necessary for the swelling takes a very long time because of the large dimensions of the body, which means considerable expenditure on energy and on the apparatus. Moreover, in the case of the known processes, adquate accuracy of shape of the softening clay mass cannot be guaranteed on account of insufficient support of the swelling clay mass by the apparatus at the top and at the sides.

In addition, DE-AS 1 942 524 discloses a process for the manufacture of thermally foamed shaped parts, in which the material is initially preformed into shaped bodies such as plates, slabs and the like, and is then conveyed through a continuous furnace with the aid of an air bed and is simultaneously foamed. Air bed conveyance is, however, very costly as to energy and cost of the apparatus, as gas flows having high temperature, high pressure and a defined composition have to be created constantly.

Processes are known in which pre-swollen granules are intended to be molded into a shaped body without simultaneous heating. Thus, a process for manufacturing building blocks has been proposed (DE-AS 11 81 611), in which clay converted into particles is heated, and the particles which are treated in this way are pressed into shaped bodies. According to U.S. Pat. No. 3,274,309 and DE-AS 1 151 460, the shaping likewise occurs by adequately heated granules being compressed in a single mold by a stamp without any further supply of heat. The manufacture of a slab in an extrusion mold is proposed in DE-AS 23 14 297. It is also known for the material to be allowed to be pressed at the foot of a vertical column of material by the dead weight of the charged column (U.S. Pat. No. 1,892,583), and to be rolled out into a continuous slab by press rolls.

In all known processes the shaping is dictated by the pressing operation, and, because there is no further heat supply to the substance, is associated with unavoidable impairment of the inner structure and with irregular compression of the shaped body.

Processes have been proposed in which the shaped body is formed by the charge material being applied in layers, sintered in layers by direct action of heat on the top layer in each case, and swollen if necessary. Here, the particles drop (DE 21 24 146 C2) onto tunnel furnace carriages arranged one behind the other and touching each other, or onto a conveyor belt, and are collected, with the thickness of the layer which is produced being able to be adjusted according to the running speed of the conveyor belt. As the surfaces of the particles are sticky when they strike the conveyor belt, they become stuck or fused together (DE-AS 14 71 408). Because the bottommost layer is subject to a very much longer heat treatment time than the topmost layer, considerable irregularities in the body have to be reckoned with in this process, especially if the swelling occurs simultaneously with the shaping, and with too large an apparatus, resulting from too small a heat transfer surface in relation to the quantity of the clay mass being treated.

Processes are known in which the shaping occurs with simultaneous heating of the mold blank and in which a free foaming of the charge is carried out. Here an increase in the external volume of the charge, a closure of the interstitial volume in the charge and sintering of the partial masses of which the charge is composed, are accomplished simultaneously. It has been proposed to heat granules poured into single molds by means of heat supply across the mold walls without any controlled introduction of gases, and to sinter them into a body (DE-PS 22 16 463, DE-OS 2 147 645). Disadvantageously long treatment times for the substance in the mold region are necessary when heating the material charge merely by supplying heat from outside across the boundary surfaces of the material charge, especially without the introduction of heating gases. As the heat supply can occur only very slowly in this case, when the shaping occurs by sintering and swelling of the particles, the number of usable naturally swelling raw materials is small, as with slow heating only a few raw materials swell suitably.

According to DE-AS 26 04 793, an attempt is made to overcome the loss of swelling capacity through too slow a heating of the clay mass by the addition of certain foaming adjuvants which can be used with heating times of up to 180 minutes and heating speeds of 2° C. per minute. The energy expenditure in the case of this process is very high on account of low charging density through using material of low density, large volume of the sintering mold and large necessary dimensions of the treatment apparatus, and also due to wear and high price of the single mold which have to be moved with the material. An increase in the speed of the heating results in a considerable difference in temperature between the edge temperature and the core temperature of the charge, whereby a severely delayed swelling or even no swelling at all occurs in the core zone of the charge, and thus, linked with this, an inhomogeneous pore size distribution. An important cause of the non-uniformity of the density distribution in cellular ceramic bodies, which occurs during swelling and sintering of the charge particles with an increase in the external dimensions of the charge and swelling of the interstitial volume, is the fact that the swelling begins with the supply of heat to the charge across the outer dimensions of the charge with no through-flow in the edge zones and corner zones of the charge, and the material which has swollen in the edge and corner zones expands into the free space above the charge. As material of low density has already swollen into there, the high density material which swells later on from the core zone can no longer expand, with the result that uneven density distribution occurs in the block.

According to DE-PS 29 41 370 C2, an attempt is made to compensate the unevenness of the swelling by heterogeneously compressing the pile of material before baking, whereby the edge regions are compressed more strongly than the core zone and the free space which is produced by the stronger compression is filled up with a further charge of material. In DE-OS-34 17 851 A1 it is proposed to produce highly porous ceramic shaped bodies with a uniform structure by baking the granulated and dried raw materials in capsule chambers which are sealed from the outset against the ambient atmosphere, at controlled excess pressure until they foam. According to DE-OS 35 38 783, it is proposed to obtain porous ceramic shaped bodies with a substantially uniform pore distribution resulting from uniform swelling up of the dried and preformed raw material, by using as a preformed raw material annular or hollow-cylindrical briquettes whose material volume takes up 40 to 60% of the internal space of the mold before the heating. The vigor of the necessary volume increase, in particular, which may lead to a fivefold increase in the volume of the clay mass, and consequently with the swelling of the charge, to a fivefold increase in the volume of the individual charge particles, in order to pass from the high density of the natural clay to that lower density of the block being manufactured, has, with free foaming, resulted in unavoidably irregular increases in volume due to mutual hindrance of the charge particles in thermal, mechanical, and in some cases, flow-mechanical respects and hence in a non-uniform density and shape structure of the product which is being manufactured.

In EP 87 114 811.0 (0 291 572 Al) it is proposed to deliver pellets to a circulating conveyor belt, to heat them by supplying heat without any controlled introduction of gases, and to foam them to fixed external dimensions by the counterpressure of a conveyor belt which holds them down.

The difficulties of the processes in which the sintering of the charge particles occurs with heating across the outer surface of the charge without gas flowing therethrough, and at the same time with the closure of the interstitial volume and with increase of the external volume, or even with a constant external volume of the charge, as in the case of the last-mentioned process, are altogether so fundamental on account of the long heat transmission paths, that overcoming them with the proposed additional measures is not possible. On the laboratory scale small blocks have been successfully manufactured by simultaneous swelling and sintering of the charge particles with a simultaneous increase in the volume of the charge, in which the swelling clay mass has encountered a universal unyielding resistance to swelling towards the end of the swelling process, resulting in a considerable build-up of pressure in the clay mass. However, the simultaneous swelling and sintering of the charge, which can be termed free foaming or free swelling, is thus unsuitable as a process on a commercial scale.

According to DE-OS 25 48 387, the supply of heat to produce the swelling could also be effected in the form of dielectric heating. As ceramic processes involving the supply of dialectric energy, in particular, are breaking new technological ground, the risk as regards process technology and apparatus technology in the case of this process is very high.

Processes for the manufacture of shaped bodies in a mold by means of heating occurring by combustion in the raw material are known (DE-AS 19 51 460 and DE 25 37 508). These processes have, however, the disadvantage that light building blocks of high porosity cannot be manufactured by means of these processes and that the quality and consequently the possibilities of use of the material thus created are severaly impaired on account of the unavoidable inclusions of combustion residues and the maintenance of temperature which is difficult to control. In order to reduce the combustion temperature to the necessary swelling temperature during the combustion in the raw material, combustion has to occur with a considerable excess of oxygen. A high oxygen content in the gases hinders the sintering process and the swelling, however, on account of too great a degree of incrustation. Moreover, the combustion in the raw material leads to the overall disturbance of the intergranular atmosphere.

DE-PS 19 14 372 described a process in which a universally unyielding, supported charge body, which is matched in its dimensions to the shaped body being manufactured, is initially formed from swellable granules of roughly uniform size, through which body a highly heated gas is then blown alternately from opposite sides for a short time until all granules have achieved a plastic bondable surface condition. What proves to be disadvantageous in the case of this process is the fact that adequate uniformity of the thermal treatment and heating speed of the product during the through-flow heating of a charge can only be obtained with an uneconomically high speed of flow, particularly because the closure of the interstitial volume of the charge which is dictated by the swelling makes a considerable rise of pressure necessary in order to maintain the flow. Furthermore, the gases flowing through the charge interfere with the development of an identical gas composition in the particles and between the particles, and influence the charge contents thermally and chemically, differently in their edge zones as compared with their core zone, especially with regard to reduction or oxidation of the particle shells, which leads to non-uniform product quality. The gases which are introduced from outside initially heat up the apparatus, which can lead to overheating of the apparatus and thus sticking of the material to the apparatus. Besides the lack of the possibility of uniform introduction of the gases into the raw material, associated with the shortness of the necessary treatment time, there occur considerable thermal and chemical variations in the condition of the gas along its path of flow in the raw material. The non-uniformity of temperature and chemical composition of the gases in the raw material which is so induced, causes localized variations in quality in the manufactured product, ranging from overburning to inadequate bonding of individual charge particles. It has been shown that the introduction of gases into the raw material for the purpose of heat supply to the raw material during the shaping by means of combustion in the raw material or by means of the flowing-through of heating gas is in fact capable of increasing the heating-up speed of the product considerably, but the speed is however still too low and, in particular, the treatment occurs to unevenly.

The processes constituting the prior art have considerable drawbacks with regard to thermal, chemical and mechanical treatment of the clay mass, with disadvantageous consequences in terms of expenditure on apparatus, energy expenditure, product quality and safety of the process, more especially in connection with heating, molding, supporting, caking and movement of the clay mass.

With regard to the heating of the clay mass, it can be confirmed that the clay mass is not heated sufficiently quickly, because the heat flow has to overcome too great a heat transportation resistance in the path in the clay mass or because heat on its way there is stored in other masses such as baking mold masses and is therefore not conveyed onto the clay mass, and because the energy current density or even the energy conversion density is not sufficiently high in the vicinity of the clay mass or the baking mold mass. Heat is stored in parts of the apparatus which are moved parallel to the clay mass, e.g. in rigid baking molds which are moved parallel to the clay mass or in crawler track links and belts, which, moreover, with regard to the energy expenditure, results in an increase of the heat energy costs on account of increased stored heat losses. The heat transportation resistance is too great if the heat transportation path in the clay mass is too long, e.g. because the clay mass has already been enlarged by cold foaming before the heating and the heat transportation path is extended by swelling not just during the heating, or if the heat transportation resistance around the clay mass is too great because it is enclosed by a rigid baking mold. Inadequate thermal treatment because of heating being too slow reduces the space-time yield and has the result that the apparatus needed is too large and consequently the apparatus expenditure and the energy expenditure are too high on account of too high heat energy costs resulting from too large wall heat losses. The energy costs dictated by the type of heating are too high because of too great gas heat losses through too large a quantity of exhaust gas or too high an exhaust gas temperature or through too high electrical energy costs resulting from heating by means of capacitive electrical heating with high conversion losses, this type of heating at high temperatures being additionally associated with a high innovation risk, or on account of a flow of the heating gas through the clay mass with great flow resistances.

With regard to the form of the clay mass used, it is established that the latter is molded by cold shaping either as a compact clay mass, or is divided, e.g. in the form of several individual partial clay masses which, for example, are combined into one charge body, or in the form of a clay mass with channels drawn therethrough or a cold-foamed porous clay mass.

DE-OS 28 14 315 proposed, for manufacturing a silicate material, a substance mixture which forms a foam at room temperature upon the addition of a further substance, which foam then has to be baked. If the clay mass has already been preformed in the cold shaping according to the external dimensions of the final shaped body, and if the clay mass is endowed with porosity, for example by being produced through cold-foaming or through blending with substances which burn out during baking, then the limit at which the baking can no longer be called baking with swelling but simple baking is reached, and hence is no longer relevant to the subject matter of the present application.

According to the prior art, the creation of a uniform shaped body by swelling of a compact clay mass is merely proposed in terms of using either a rigid bed or an air bed as a support below the swelling clay mass—a support in other directions is not mentioned.

The creation of a uniform shaped body by swelling of a divided clay mass can, according to the prior art, be termed conventional but disadvantageous.

If the mass is pre-swollen, and if therefore in the use of the clay mass being divided into individual partial clay masses, the swelling is carried out partly or exclusively before the necessary sintering of the partial clay masses in order to re-combine them into one whole clay mass, that is before the sintering of surfaces of the individual or connected partial clay masses, then the surfaces of the partial clay masses are oxidizes in order to stabilize them, to create a more solid shell and to make the surface non-adhesive. An attempt has been made to sinter the partial clay masses, which, as a result of the oxidation of their surfaces, have a reduced sintering capability, without pressure, resulting in a very small stiffness of the product, or by swelling pressure by means of further heating in a baking mold or by pressure exerted from externally, this resulting in slight uniformity through inner deformation during the pressing, in too high a shaping force expenditure and shaping energy expenditure and in too slight a stiffness of the product through inadequate sintering.

The supporting of the swelling clay mass is effected in a disadvantageous way both during swelling of a not pre-swollen clay mass and also during the swelling and sintering of a pre-swollen clay mass.

If the divided clay mass is so pre-swollen or so cold-formed that it already has the external dimensions of the shaped body constituting the product before the swelling or final swelling, then only the swelling which is necessary for closing the interstitial volume occurs, with simultaneous sintering, especially with all-round support of the clay mass if the clay mass is in the form of a charge, and the increase in volume takes place uniformly, since the greater part of the volume increase of the charge particles can be accomplished, while the mutual hindrance of them is prevented and the charge particles which are consequently regularly swollen are brought together in a prearranged uniform spatial density distribution in the dimensions of the block which is being produced, whereby no non-uniform increase in volume in order to close the interstitial volume is any longer even capable of substantially impairing the prearranged uniform spatial density distribution. During the swelling however, high pressure builds up in the clay mass on account of all-round unyielding support. With increasing pressure, the tendency of the swelling clay mass to cake on to the apparatus increases, in particular.

If the divided clay mass is not pre-swollen or is so cold-formed that, before swelling or final swelling, it has smaller external dimensions that the shaped body of the product, then the clay mass swells freely outwards, because there is not all-round support of the clay mass. The swelling thus occurs too unevenly, because the hot shape formation of the clay mass occurs in too uncontrolled a manner and at too low a pressure. Counterpressure only at the end of the swelling, through an all-round unyielding rigid support for the subsequent equalization of the mass distribution within the shaped body volume is not possible to the extent necessary and is associated with too high a pressure between clay mass and apparatus.

The swelling of a divided and therefore not compact clay mass, not only during the swelling of a non-pre-swollen clay mass but also during the swelling and sintering of a pre-swollen clay mass into a large-size shaped body, occurs to feebly, particularly with invariable external dimensions of the clay mass, and occurs too unevenly, particularly with variable external dimensions of the clay mass, because the treatment, more especially the heating of a non-compact clay mass, occurs too slowly or too unevenly. If the heating of a non-compact clay mass is accomplished more rapidly, especially without any through-flow, so that less swelling capacity becomes lost, it occurs too unevenly, so that if there is no top wall or cover on the baking mold, there is a non-uniform density distribution in the shaped body or the shaped body has irregular external dimensions.

The caking of the clay mass on the apparatus which is guiding it is not prevented or is only preventable with too high an expenditure. An attempt has been made to prevent the caking of the clay mass on the apparatus resulting from the outer surface of the clay mass being reduced from the inside at high temperature during the swelling, by having separating means between the clay mass and the apparatus, such as graphite, sand, pressurized gas, or by using material for the apparatus which is supposed not to cake, such as magnesium oxide, magnesium chromite or similar, or by gas jet surfaces, or to render it harmless through shaping by means of permanent formwork, which results in too high an expenditure on the material of the apparatus and energy for gas jet flow or expenditure on raw materials, auxiliary means and operating means, or to prevent caking by keeping the surfaces of the apparatus which comes into contact with the swelling mass cold, and heating from inside the clay mass through heating by means of electrical heat generated inductively, capacitatively or conductively in the clay mass, which, however, requires high apparatus and energy costs to generate it.

The hot shaping occurs with too great a shaping force, and in consequence there is too great a bonding or frictional force arising from too high a pressure on the contact surface between clay mass and apparatus from inside or outside, and hence too high an essential power or energy expenditure for moving the clay mass.

The decisive disadvantages of the known processes are therefore to be seen on the one hand in the too slow or too uneven heating and also the too uneven chemical influence during the swelling process, with the consequence of high swelling gas loss and also too high a density and too uneven a density of the cellular ceramic shaped body and inadequate strength of the shaped body resulting from inadequate sintering in the case of charge particles which have to be sintered, and on the other hand in too high an energy consumption (through an insufficient degree of heat utilization in consequence of heat currents, more especially hot gas currents, which are inadequately directed from the point of view of process technology and plant technology), and also the danger of caking of the swelling clay mass on the apparatus and the inadequate shape stability of the soft clay mass during the swelling operation, and, in some cases, the sintering operation.

Summing up, it can be concluded that in the manufacturer of large-size porous ceramic shaped bodies of low density by means of heating and swelling of the clay mass, because of the necessary speed and uniformity of the heating during the swelling process, the danger of caking and the inadequate shape stability of the clay mass during the swelling, has, according to the prior art, especially if it is characterized by the formation of charges and the swelling of them and the necessity for sintering of the charge particles to each other, proved to be an insoluble problem, so that large-size shaped bodies with a uniformly low density and also uniform and high porosity, strength and precise shape have not hitherto been able to be manufactured economically.

SUMMARY OF THE INVENTION

Accordingly, it is an object of the present invention to provide a process and an apparatus for manufacturing shaped bodies of the above mentioned type, which avoids the disadvantages of the prior art.

More particularly, it is an object of the present invention to provide a process and an apparatus for manufacturing shaped bodies of the type mentioned above, in which the swelling operation can be carried out in the shortest possible time, avoiding the disadvantages with which the prior art is beset, and in which the clay-mineral mass undergoes a uniform and rapid thermal, chemical and mechanical treatment with the lowest possible expenditure on shaping and transportation without sintering.

In keeping with these objects and with others which will become apparent hereinafter, one feature of the present invention resides, briefly stated, in a process for manufacturing large-size porous shaped bodies of low density by swelling clay masses by supplying heat thereto, which is characterized in that a clay-like self-supporting clay mass is used, the swelling clay mass is given all-round support by direct acting, multiple linear solid body contact, but is maintained in constant motion relative to the support, and the surface of the swelling clay mass is subjected to constant oxidation by supply of oxidizing hot gases to the surfaces of the clay-like moving clay mass.

Another feature of the present invention resides in an apparatus for carrying out the above-specified process which rotating rollers with gas-permeable intermediate spaces in form of four synchronously driven roller sets arranged in a swelling zone in order to support the swelling clay mass, horizontal roller sets arranged underneath and above, and vertical roller sets arranged at the sides of the swelling clay mass, with openings for introducing and drawing off oxidizing gases being located above and below the clay mass.

When the process is performed and the apparatus is designed in accordance with the present invention, it eliminates the disadvantages of the prior art and achieves the above-specified objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a perspective view showing the apparatus for manufacturing large-size porous shaped bodies of low density, in accordance with the present invention.

DESCRIPTION OF THE PREFERRED EMBODIMENTS

In accordance with the present invention, a process for manufacturing large-size porous shaped bodies of low density by swelling clay masses by supplying heat thereto is proposed. A plate-like, self-supporting clay mass is used. The swelling clay mass is given all-round support by directacting, multiple linear solid body contact, but is maintained in constant motion relative to the support. The surface of the swelling clay mass is subject to constant oxidation by the supply of oxidizing hot gases to the surfaces of the plate-like moving clay mass.

By comparison with all known processed, the process according to the invention solves the highly complex problem of carrying out the swelling operation during the shaping in the shortest possible time necessary for the process, uniformly with a definite quality over the entire cross-section of the substance, which process is a prerequisite for the economic mass-production of cellular ceramic shaped bodies and in the prior art has proved to ben an insoluble problem.

The process according to the invention for the first time enables the advantageous results of swelling to be achieved. These results are achieved on small swelling bodies in the laboratory chamber oven under the almost ideal conditions for material technology and heat technology which prevail therein for the swelling process, and can now also be obtained in the proposed industrial continuous extrusion manufacturing process, since the clay mass exist as a compact mass in the form of a thin plate shape which can be rapidly and uniformly heated by short heat conduction paths and large heat transfer surfaces and by simple geometry, and consequently can be intensely and uniformly swollen.

As a shaped body manufactured from clay only has the necessary strength and other required properties when the clay mass from which it is manufactured is baked, the clay mass must be baked. During baking, the conversion of a molded and dried clay mass into the dimensionally stable rigid ceramic body occurs, on the one hand by the separation of the chemically bound water in the clay minerals, and on the other hand by sintering following melting processes in the clay mass. In order to bake the clay block, the clay must be heated: it may have any geometrical shape. It must be kept in block shape at the baking temperature for a defined time and also must be cooled again as a block.

The swelling of a mass of clay-mineral raw materials, as known predominately from the baking of clay masses in order to manufacture coarse ceramic products, is a process which can occur during the heating of clay masses until they soften, and in which an expansion of the softening clay mass to a porous body occurs. The basic prerequisites for the swelling of clay are, on the one hand, a formation of gas to an adequate extent in the clay mass, and on the other hand, a soft moldable condition of the clay mass through high temperature, with a certain viscosity, so that the clay mass is in a position to keep the gas which develops in it trapped and to expand with pore formation under the action of the gas pressure. Viscosity of the clay mass and gas development in the clay mass are dependent upon the material composition of the clay mass, the type and manner of the heating of the clay mass and also on the baking atmosphere, and thus on controllable influences which make it possible to control the swelling.

During the heating, the shape of the clay mass may be variable. The clay mass can, in the form of one clay mass, be heated as a foam block, hollow block, solid block, hollow plate or solid plate, or in the form of several partial clay masses as a cylinder charge, hollow cylinder charge or as several plates.

The main object of a process and an apparatus for manufacturing large-size porous shaped bodies of low density by swelling of clay masses by supplying heat, is to obtain an expansion of the softening clay mass to a large-size porous body, by means of the heating of the clay masses until they soften, and to utilize the advantages which exist in baking with swelling as compared with baking of a non-swollen clay mass which has already been preformed in a large-size manner and possibly even porously before the baking. It is therefore understandable that the advantage of baking with swelling becomes less great the more strongly the clay mass is preformed already before the baking. In connection with this the disadvantages of swelling are even reinforced, but conversely, the advantages contribute more strongly, in that the less the clay mass has already been preformed in a large- size manner, the more compact it is before the baking with swelling. Further objectives are uniform large-size geometry of the shaped body based on uniform external shape and uniform pores. A uniform low density and high strength of the shaped body resulting from the existence of many pores is obtained by uniform swelling of the clay mass as a result of uniform heating of the clay mass exclusively from above and below with all-round and upwardly yieldable support of the swelling clay mass during the whole swelling process and use of a clay mass which requires no sintering of partial clay masses.

The clay mass should swell freely either inwards or outwards but exist in the form of a compact clay mass at the commencement of the swelling, and the hot shaping should take place only upwards during the whole swelling process under low pressure, by means of all-round support and yielding of the support.

In a compact clay mass, and thus in a clay mass which is not divided and has no heating gas flowing through it, an undisturbed synergistic effect of swelling gas development and viscosity change the mass occurs during the swelling process, especially with oxidation of its surface from the outside. The swelling gas-developing reaction is an iron oxide reduction reaction because of the carbon in the mass. On the one hand it supplies the swelling gas since it produces a mixture of CO and $CO_2$, and on the other hand, from the iron oxides heamatite $Fe_2O_3$ and magnetite $Fe_3O_4$ it allows the ferrite FeO acting as a flux to exist in the clay mass, whose viscosity falls. The swelling gases which result and partly force their way out of the clay mass are, moreover, re-reducing gases which act in a reducing manner on the surrounding mass. The development of the swelling gases and the trapping of the gases act synergistically through the pyroplastic mass which softens as a result of the reduction, especially because of the compacting of the surface of the clay mass, and the swelling process suddenly escalates through the entire volume or over the entire cross-section of the slab.

Uniform swelling of the clay mass is promoted by uniform heating and uniform counter-pressure to the swelling pressure during the entire swelling process on all sides of the swelling clay mass.

According to the prior art concerning the manufacturer of large-size shaped bodies by means of the swelling of clay masses, the requirement of all-round support, if it is really fulfilled, constitutes a problem which has not hitherto been solved with reasonable expenditure, as the swelling clay mass tends to cake and therefore represents a central problem which has to be overcome cheaply and without any operating difficulties.

In order to avoid caking of the swelling clay mass on the apparatus with low expenditure, there are two known facts which are utilized in the proposed processes, especially in the manufacture of swollen clay pellets in rotary kilns. On the one hand the oxidation of the surfaces of swelling clay masses and on the other hand the constant movement of them against the parts of the apparatus which support them prevents the caking of swelling clay masses to each other and on the parts of the apparatus supporting them. They are deliberately used in the case of the process according to the invention for the first time in order to prevent caking of a large-size swelling clay mass on the parts of the apparatus supporting the mass, since according to the invention the all-round support of the swelling clay mass is effected with intermediate spaces. On the one hand oxygen can be conveyed through theses spaces to the surfaces of the swelling clay mass for the oxidation of them, and is conveyed according to the proposal, and on the other hand a constant mutual rolling motion takes place of the large-size swelling clay mass and the parts of the apparatus supporting it, whereby the boundary surface contacts occur only for a brief period which can be regarded as non-prejudicial.

Caking of the swelling clay mass on the parts of the apparatus whose surfaces support the mass in a laminar manner is prevented according to the invention, in spite of constant all-round direct mechanical support of the swelling clay mass during the entire swelling process which prevents a lateral bulging of the softening clay mass. On the one hand it is believed because the swelling clay mass is continuously moved relative to the parts of the apparatus supporting it, and on the other hand h=cause by all-round constant oxygen supply by means of the feeding of oxidizing gases to the outer surface of the swelling clay mass, the latter is made yielding, and despite expansion by swelling, slightly stiff and non-sticky. Furthermore, the excess swelling gases can escape freely during the swelling process, in spite of constant all-round direct support of the swelling clay mass.

Through uniform treatment with gases of an oxidizing composition during the entire swelling process, there is produced a uniform, adequately laminar oxidation of the outer surface of the clay mass from the outside during the swelling, as a result of which a non-sticky, more highly solid and growing skin is formed on the clay mass during swelling, which prevents the caking of the clay mass on parts of the apparatus which come into contact with the mass during the swelling.

Tests show that the oxidized surface of a swelling clay mass enlarges in an environment with an oxidizing gas composition, since the already oxidized surface is constantly cracked and a new oxidized surface is formed, so that a split surface is produced. The oxidized surface becomes cracked, and the cracks increase. The soft, reduced core mass forcing its way between the cracks in the oxidized surface is oxidized by the surrounding oxidizing gas and becomes a constituent of the enlarged oxidized surface. Thus, the inside of the swelling body which moves outwards constantly re-oxidizes and a new oxidized surface is continually formed.

By comparison with known processes, the new process has the considerable advantage that the pores are formed rapidly and uniformly in the body, because the swelling of a compact clay mass in cooperation with the sealing oxidation of its surface makes possible an untroubled expansion of the composition of reducing gases arising inside the clay mass uniformly through the whole clay mass, which is advantageous for the swelling. The uniform composition also produces a very uniform treatment from a chemical point of view and, resulting from this, a uniform product quality. The regular gas creation in the clay mass produces a simultaneous and uniform swelling of the clay mass, which is also a prerequisite for producing a product of uniform density and pore structure.

The clay mass is not divided during the cold forming, so that no internal partial surfaces of the clay mass, particularly those which are not oxidized, have to be sintered during the hot forming, and the clay mass, is, as a compact mass, like a ball, swollen as a compact body, like a ball with an oxidized outer shell and reduction on the inside.

The use of an undivided compact clay mass, together with the oxidation of the surface, brings about the creation of a reducing uniform gas composition within the clay mass induced by organic constituents, which, together with the slight uniform counter-pressure from outside against the pressure of the swelling gases from inside, leads to the gas creation taking place evenly in the smallest partial zones of the clay mass. Consequently many pores are formed evenly, which produces a uniform density and strength in the porous shaped body.

In accordance with another feature of the present invention, the dried clay masses entering the furnace in the form of a thin, compact, self-supporting plate-like slob are suddenly continuously rapidly swollen by heat supplied exclusively from above and below at maximum furnace temperature which remains constant from the beginning to the end of the swelling. The advantages of these features are as follows:

In practical successful tests, it has been shown that the uniformity and the speed of the heating are of decisive significance for the manufacture of cellular ceramic bodies.

The rapid heating of the clay mass is a prerequisite for sufficiently strong swelling and hence for the achievement of the desired low density of the shaped body which is being manufactured.

The uniform heating of the clay mass is a prerequisite for uniform swelling in the entire body, which is also a prerequisite for the achievement of a uniform pore structure in the shaped body which is being manufactured.

High swelling speed and therefore maximum reduction of the density of the clay mass, and also a high space-time yield of the process, is achieved by reduction of the density and expansion of the clay mass by means of swelling of the clay mass during the heating of the clay mass up to baking with a constant heat supply, no pre-swelling, after-swelling or sintering or compression.

As a result of its softening during the swelling, the clay mass requires a reinforcing hot forming. It has been shown that the expenditure on heat, material conversion and apparatus technology is lowest when the clay mass remains in the forming mode for as short a time as possible. The short heating time makes possible very short swelling times and thus forming times, and hence, with continuous forming, short forming distances and thus low frictional resistance for the transportation of the clay mass.

The heat is supplied exclusively from above and below, so that there are uni-dimensional and thus uniform heat currents, and swelling occurs only in one direction, namely upwards, so that maximum change in the thickness of the clay mass and therefore a minimum average heat conduction path is achieved.

High speed of heating of the clay mass is achieved, since on the one hand the clay mass has a thin and compact shape, and since on the other hand the mass and also the paths for the heat conduction increase only during heating for purposes of baking, and the density is first reduced during the heating. The mass is swollen very rapidly in 5 to 10 minutes like a spherical mass, as it has a similarly small heat conduction path on the inside of the clay mass and a surface which is accessible from the outside at all points of the heat supply.

High uniformity in the heating of the clay mass is obtained, since on the one hand the clay mass has a uniform shape, and on the other hand the heat supply occurs exclusively uni-dimensionally from above and below and is evenly applied to the clay mass.

Still a further feature of the present invention is that the softening and swelling clay mass is pressure-regulated with no lateral or downward yielding and permitting yielding only upwards, which with increasing height of the clay mass, according to the curved course of the swelling, is countered by an adjustable, structure-stabilizing counterforce against the swelling force. The counter-force permits variable geometrical expansion of the mass and with smoothing by rollers. The mass is supported on all sides, at the rear by the unswollen clay mass which is held by means of frictional resistance by rollers and at the front by the already-swollen clay mass which is held by means of frictional resistance by rollers. This provides for the following advantages:

The action of any non-uniformity in the heating making the swelling uneven can actually be partly compensated by uniform mechanical counter-pressure, but with a view to having the lowest possible contact pressure of the clay mass against the supporting apparatus, in order to achieve the smallest possible caking tendency, the direction of the heat supply is so selected according to the invention that it lies not in the supporting direction of the rigidly supporting parts of the apparatus, but in the supporting direction of the yieldable supporting parts of the apparatus.

Through exclusively upwardly yieldable support, the swelling clay mass is guided exclusively upwards with a slight shape-maintaining counter-pressure, extending the heat conveying paths uniformly, so that it expands into the predetermined, larger, external shape.

Still a further feature of the present invention is that with increased demands for uniformity of the pores and uniformity in the quantity of the end product which can be obtained therefrom, the process is controlled so that the pressing forces which damage the cell walls and also the structure are avoided by creating an isostatic pressure which is so controlled that the shaping occurs during the swelling operation by suitably arranged top rollers. Thereby a very fine distribution of the pores in the smallest partial areas of the clay mass is ensured with the simultaneous creation of a high proportion of closed cells. This is effected by application of heat flow in one direction of flow, resulting in the maximum change in the thickness of the clay mass, which is equivalent to a minimizing of the average heat conduction path and thus a maximizing of the speed of the heating. This results in the following advantages:

In order to obtain swelling exclusively in a vertical direction and in order to prevent swelling in horizontal directions, the yielding support of the swelling clay mass occurs only upwards, and the heat is supplied exclusively from above and below, since the swelling clay mass expands to where it encounters the lowest mechanical resistance and to where the most heat flows.

The clay mass is guided on all surfaces during the entire swelling process, but the transportation frictional resistance to the movement of the clay mass and the molding force which has to be applied from outside for the comparatively hot shaping and supporting of the swelling clay mass is low however, since the comparative resistance of the apparatus acts from outside, whose dimensions increase with the expansion of the clay mass and encounters only as much resistance as is necessary in order to produce adequate uniformity in the swelling, and therefore applies only as much resistance as is necessary in order to retain the parallelepiped shape during the swelling, contrary to the inclination of the swelling body to form a spherically swollen shape.

In accordance with still a further feature of the present invention, in order to regulate the height of the already-swollen clay mass, the actual values of the height are sensed via the last top roller at the end of swelling zone, and the clay mass is so strongly pressed against the clay mass in the output zone by the apparatus which moves and supports the mass in the input and swelling zones that the clay mass at the end of the swelling zone which is softened to the greatest extent, becoming compressed in a horizontal direction, extends upwards until the desired nominal height value is reached. This provides for the following advantages:

The continuous all-round and upwardly yielding supported movement of the clay mass during the swelling of the clay mass is preferably supplemented by a control of the front and rear ends of the swelling clay mass, which, as a result of the "hydrostatic" pressure expansion in the swelling clay mass with firm support at the bottom and also on the right and left, makes possible the simultaneous control of the expansion of the clay mass upwards, and thus of the height of the shaped body which is being manufactured.

A further feature of the inventive apparatus for carrying out the process is that friction-reducing synchronously rotating rollers with gas-permeable intermediate spaces in form of four synchronously roller sets are arranged in the swelling zone in order to support the swelling clay mass. Horizontal roller sets are arranged underneath and above, and vertical roller sets are arranged at the sides of the swelling clay mass, with openings for introducing and drawing off oxidizing gases located above and below the clay mass. This provides for the following advantages:

Low power consumption as a result of there being merely rolling firction resistance for the movement of the clay mass by roller transport, and no sliding friction resistance as in a stationary baking mold, or adhesive force deforming resistance as in a baking mold with an associated parallel motion, and no caking.

In accordance with the invention radiation heat-creating resistance heating elements are arranged above and below the slab and distributed in lines in order to swell the slab-like clay mass by supplying heat thereto. This also provides for additional advantages specified hereinbelow.

A high heating speed requires that the energy current density or energy conversion density of heat sources in the vicinity of the clay mass is high outside or inside the shaped body volume, and that there are no heat sinks there. The heating of the clay mass during swelling occurs in order to produce a high energy current density in the vicinity of the clay mass without parts of the apparatus having to be moved forward parallel to the clay mass, and the heat is generated in parts of the apparatus enclosing the clay mass, with high energy conversion density by means of the generation of electrical heat by resistance heating elements.

The necessary high uniformity of the furnace temperature lengthways and crossways above and below the swelling clay mass and also the necessary high heat current density in the furnace in the direction of the swelling clay mass to achieve very rapid and very uniform heating of the clay mass, can be achieved particularly advantageously by laminar, distributed resistance heating elements which in addition, in contrast to the use of heating gases, are advantageous as heat sources, since with electrical heating elements the quantity of heat supplied can be regulated independently of the gas consumption of the oxidizing gas, and can thus be adapted optimally to the requirements of the process.

In the inventive apparatus the top roller set comprises horizontal rollers which are movable individually in terms of their height and which in each case by means of pistons communicating with each other and actuated above and below with the same pressure, rest upon the slab, under controlled pressure and with equal force, and are driven synchronously via the chain with the other rollers of the swelling zone. The horizontal top rollers are each held by hoops which are rigidly connected with the pistons to control the contact force and which, in order to transmit the synchronized rotational motion to the rollers carried by them, are each ridigly connected to a pair of bevel gear wheels which transmit the rotational motion from the horizontal axis of rotation of the rollers to the rectangular shaft having a vertical axis of rotation. The rectangular shaft is slidable laterally and is adjustable as to its height in a stationarily mounted gear wheel, in order to accept the rotational motion from the stationary drive means. The advantages of this construction are as follows:

Low shape-forming force through dimensionally varying support of the clay mass, which increases with the increase in the external dimensions of the clay mass. Low shape-forming force by means of an apparatus which, with a resistance adjustable from zero or larger, counteracts the body, which is inclined to adopt a rounded shape, with a four-square resistance to the swelling force, retains the rectangular shape during the swelling and opposes the swelling with a constant force which is only as much as is necessary for the maintenance of the rectangular shape. Low shape-forming force by means of the use of the inherent spherical shape-forming force through shape forming as a result of oxidational solidification of the outer surface of the clay mass and swelling pressure of the inner clay mass. Internal equilibrium of the pressure forces between the hard shell mass and the soft core mass.

Finally, in order to feed the slab into the swelling zone, the apparatus in the input zone has a group of synchronously driven horizontal input rollers, including a bottom roller set and a top roller set. In order to withdraw the slab from the swelling zone the apparatus in the output zone has a group of synchronously driven horizontal output rollers including a bottom roller set and a top roller set. The rollers of the input zone and the rollers of the swelling zone on the one hand, and the rollers of the output zone on the other hand, are provided with a drive means whose speed of rotation can be controlled independently. This provides for the following advantages:

In order to support the front and rear faces of the swelling clay mass in such a way that one ensures that the clay mass swells exclusively upwards and expans sufficiently far upwards, since the roller track assemblies in the input zone and the swelling zone can temporarily run correspondingly more rapidly than the roller track assembly in the output zone, in order to compress the swelling clay mass so strongly at the end of the swelling path that the swelling clay mass expands upwards to the desired height, the rotational speeds of the rollers of the roller track assemblies of the input zone and swelling zone on the one hand, and of the output zone on the other hand, can be controlled separately from each other.

The operation of the inventive process and apparatus is continuous. It results in a simple controllability and no adhesion force deformation resistance by continuous movement of the swelling clay mass.

The economic significance of the inventive process and apparatus is that it becomes possible for the first time to swell continually uniformly and rapidly, large-size bodies which hitherto have been able to be heated only too unevenly or too slowly and with uneven chemical influence, and therefore to manufacture cellular ceramic bodies such as multi-story high wall elements with low density.

By the abandonment of granulation of the clay after the preparation, entire process stages can be omitted, more especially the costly pre-swelling of the charge particles, dosing, equalization, loading of the charge, and thus operations which are unremuneratively costly, particularly in the high temperature range. The expenditure up to now on inhomogeneous pre-compression of the charge in the case of tunnel furnace processes is also unnecessary.

With more rapid heating, which is provided according to the invention, a very much larger number of raw materials react by swelling than with slow heating, whereby the number of usable raw materials and the swelling capability of controlling additive increases, such as, for example, red muds, which as problem waste substances of the aluminum industry can be used here profitably and in a way which is environmentally friendly. The same applies to the combustion of clarified muds with injurious organic and metallic substances which are otherwise inadequately disposed of in hydraulically bonded substances. From ecologically optimum points of view, the possibility of choice regarding the use of storage premises also increases considerably.

The economic significance of the features of these claims arises from the fact that in the specialist world of bricks, there has long existed the frequently expressed opinion that structural elements, e.g. of cellular ceramic material in the form of plates, as long as they can be manufactured economically, would be of the greatest commercial use.

From a technological cost and commercial standpoint as well as from the point of view of the transfer of technology to countries with extreme climates, there result from the advantages of the products manufactured in accordance with the invention the following particularly advantageous spheres of use, which are given by way of example.

The almost identical thermal expansion of structural elements composed of porous ceramics and ceramic tiles produces an excellent possibility of use in prefabricated room dividing walls with special hygiene requirements, such as in baths, swimming baths, food businesses or bath houses. The high thermal insulation, which is roughly equal to wood, as a result of high porosity, with additional non-inflammability, dimensional stability and, at the same time, good adhesion for the application of barrier layers against the penetration of water and sound, also speak in favor of the use of this. Besides new buildings, its use in the case of modernization of old buildings is of special significance, because the low density in subsequent introduction into existing rooms fulfills the demand for minimum static loads in building and is favorable to the fixing of fittings which hang on walls. The latter arises from high inherent rigidity and the ready possibility of working the material by sawing, drilling and pegging. Here, the possibility of multi-story high, jointless construction of wall plates as a result of the possibility of manufacturing in large sizes, comes fully into its own. In spite of this high specification, transport in accordance with the construction site rule "four men—four corners" or "two men—two edges" remains easy to fulfill. As an additional advantage there occurs in all cases an increase in the fire protection of walls and/or ceilings. This advantage is important especially in wall surfaces of staircases, where the protection of persons through non-inflammability is of special importance.

The insensitivity to chemical influences from the environment or from cleaning agents, in conjunction with the high thermal insulation properties and low heat storage capacity leads to a specially preferred use in sauna establishments or in the construction of sports stadia, in which rapid heating or cooling often for only short periods of use has a special bearing.

Thanks to the high proportions of closed pores and the associated permanent buoyancy, as well as high durability in the face of changes caused by frost and dew and resistance to fungi and coating with moss, there is an advantageous sphere of use in the covering of flowing or stationary waters including drainage areas or drinking water reservoirs, with the object of reducing evaporation of scarce water or protection against environmental influences, such as sulphuric acid or combustion residues. Enclosing walls of buildings with this material as a composite construction with mineral, metallic or polymeric foams means that one can raise the fire resistance class of the relevant material compounds.

Example of application of the process:

Composition of the Clay Mass (% By Weight)

| | | |
|---|---|---|
| 60.4 | $SiO_2$ | |
| 23.6 | $Al_2O_3$ | |
| 6.85 | $Fe_2O_3$ | |
| 0.65 | FeO | |
| 1.75 | CaO | |
| 1.50 | MgO | |
| 3.20 | $K_2O$ | |
| 0.32 | $Na_2O$ | |
| 1.09 | $TiO_2$ | |
| 0.48 | $SO_3$ | |
| +5.0 | converter dust addition | |
| Density of the dried mass | | 1740 kg/m$^3$ |
| Furnace temperature: constant | | 1170° C. |
| Oxidizing gas: | | air |
| Swelling time: | | 15 min |
| Slab width of the clay mass: | | 50 cm |
| Slab height of the dried clay mass: | | 1.2 cm |
| Dimensions of the finished shaped body: | | |
| Height: | | 5.0 cm |
| Width: | | 50 cm |
| Length: | | 250 cm |
| Density of the finished shaped body: | | 420 Kg/m$^3$ |

An embodiment of the apparatus according to the invention is shown by way of example in the drawing.

Reference numeral 1 indicates a housing which is constructed so that it is thermally insulated, and inside which the thermal treatment of the swellable clay mass occurs. The clay mass enters the housing 1 as an unswollen mass in the direction of the arrow 2 and leaves the housing as a swollen mass in the direction of the arrow 3.

The housing 1 is essentially divided into three different successive zones, namely an input zone 5, a swelling zone 6 and an output zone 7, corresponding to the run-through direction of the mass 4 indicated by the arrows 2 and 3. The input zone 5 essentially serves only for the conveyance of the slab-like or plate-like unswollen mass 4, the swelling zone 6 for the thermal treatment of this mass, more especially the swelling, and the output zone 7 serves only for the conveyance or discharge of the swollen product. In the drawing the progress of the swelling is indicated by the thickness 8 of the mass 4, the swelling commencing in the swelling zone 6 and increasing in the run-through direction.

In the input zone the mass 4 is supported from below by the rollers 9, in the swelling zone by the rollers 10, and in the output zone by the rollers 11, which are spaced from each other. A guidance of the mass 4 from above is effected in the input zone by the rollers 12, in the swelling zone by the rollers 13, and in the output zone by the rollers 14. All the rollers 13 to 15 are again spaced from each other. Furthermore, at least in the swelling zone 6, lateral support is provided for the mass by vertically rotatable rollers 15, 16, which are also spaced from each other and positioned in the gaps between the rollers 13.

The rollers 9 and 12 of the input zone 5, the rollers 15 and 16 of the swelling zone and also the rollers 11 and 14 of the output zone are rotatable in the walls of the housing 1 in a way which is not illustrated in greater detail, but they are otherwise mounted to be non-displaceable. The top rollers 13 in the swelling zone 6 on the other hand, are mounted so as to be displaceble vertically in a defined manner, i.e. in the direction parallel to the arrows 17. For this purpose they are received in U-shaped hoops 18 which bridge over the housing 1 at the top. Vertical sections 19 of the hoops are in working communication with laterally arranged piston-cylinder units 20. Their pistons are indicated diagrammatically at 21 and they are individually provided with pressure medium supply lines 22. It will be appreciated that by pressure medium actuation of the individual pistons 21, a compressive force which can be adjusted individually for each piston-cylinder unit 20 can be exerted on the swelling mass in order to influence the swelling operation mechanically in the sense of the procedure outlined above.

A pressure means, e.g. a chain, which links the rollers 9 and 10 of the input zone 5 and of the swelling zone 6 is indicated at 23. A comparable traction means which drivingly links the rollers 11 of the output zone 7 is indicated at 24. Consequently, the rollers 9 and 10 of the input zone 5 and of the swelling zone 6 on the one hand, and the rollers 11 of the output zone 6 on the other hand, are respectively synchronously driven, and are in communication with electric drive means which are not shown in the drawing and whose speed can be controlled. The upper rollers 12 and 13 are also given synchronously with the lower rollers of the input zone 5 and swelling zone 6. Finally, the upper rollers 14 of the output zone 7 are driven synchronously with the lower rollers 11. The lateral rollers 15 and 16 are also given synchronously with the rollers 10 of the swelling zone 6, the former likewise being linked in a driving mode via respective traction means 25.

Reference numeral 26, indicates a positionally fixed drive means, which transmits a rotational movement to the shafts 27 mounted so as to be movable vertically, i.e. parallel to the direction of the arrow 17. A pair of bevel gear wheels 28 which serve to provide the link with the rollers 13 is arranged at the bottom end of each shaft 27. All the shafts 27 are connected with each other via the drive means 26. Reference numberal 29 indicates laminar resistance heating elements situated inside the housing 1 both underneath and above the mass 4. They are provided with holes 30 for the introduction and removal of oxidizing gases which can consequently act both from above and from below on the mass which is being treated.

It will be understood from the foregoing description that the swellable mass 4 to be thermally treated is supported in the input zone 5 within the apparatus by line contact, and is guided by synchronous driving of the rollers arranged above and below the mass. In the swelling zone 6 the mass is supported unyieldingly at the sides and underneath, once again by line contact, but is conveyed at the same time. At the top there is likewise guidance which is characterized by line contact, but which is adjustable power input is designed to be yieldable in order to control the swelling process. In the output zone 7 there is once again guidance and conveyance of the swollen mass characterized by line contact and arranged to be unyielding both above and below. The process conditions which are set in the swelling zone 6 are characterized by a controllable heating above and below the mass, an all-round subjection of the mass to oxidizing gases and an expansion of the mass 4 which occurs as a result of the swelling process and which takes place in opposition to a pressure force generated by individually adjustable rollers 13.

It will be understood that each of the elements described above, or two or more together, may also find a useful application in other types of constructions differing from the types described above.

While the invention has been illustrated and described as embodied in a process and apparatus for manufacturing large-size porous shaped bodies of low density by swelling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A process of manufacturing large-size porous shaped bodies of low density by swelling clay masses by supplying heat thereto, comprising the steps of introducing an unswollen plate-like, self-supporting clay mass in the form of a thin, compact clay slab into a furnace and suddenly continuously rapidly swelling the slab by heat supplied exclusively from above and below at a maximum furnace temperature which remains constant from the beginning to the end of the swelling;

subjecting the surface of the swelling clay mass to constant oxidation by supply of oxidizing hot gases to the surface of the clay slab;

giving the swelling clay slab a support by direct-acting, multiple linear solid body contact, while maintaining the swelling clay slab in constant motion relative to the support, said support being effected by rollers being rotatably arranged below, above and on both sides of the swelling clay slab;

said introducing of said clay slab into said furnace being effected by driving said rollers;

guiding the clay slab during its movement through said furnace by said rollers in the downward and lateral directions in an unyieldable manner, while yieldably guiding the clay slab in the upward direction;

counting the yielding of the swelling clay slab upwards during increasing of its height by an adjustable structure-stabilizing counter-force against a swelling-force;

using said adjustable counter-force for variable geometrical expansion of the swelling mass for controlling the swelling process, said controlling of the swelling process including creating an isostatic pressure controlled so that shaping occurs during the swelling by top rollers above the swelling clay mass to provide a fine distribution of pores, said guiding of the clay slab including supporting the swelling mass on all other sides so that at a rear it is supported by an unswollen clay mass, which is held by means of frictional resistance by rollers and at the front it is supported by an already swollen clay mass which is held by means of frictional resistance by rollers.

2. A process as defined in claim 1, wherein said countering also including simultaneous smoothing by rollers.

3. A process as defined in claim 2; and further comprising the step of regulating the height of the already swollen clay mass, said regulating including sensing the actual values of the height by a last top roller at an end of a swelling zone and pressing the clay mass so strongly against the clay mass in an output zone by an apparatus which moves and supports the clay mass in an input zone and swelling zone so that the clay mass at the end of the swelling zone which is softened to the greatest extent, becomes compressed in a horizontal direction, expands upwards until a desired nominal height value is reached.

4. A process as defined in claim 1; and further comprising the step of controlling the swelling to prevent damage to cell walls and structure, said controlling including creating an isostatic pressure controlled so that a shaping occurs during the swelling by top rollers above the swelling clay mass to provide a fine distribution of pores in the smallest partial areas of the swelling clay mass with simultaneous creation of a high proportion of closed cells.

5. A process as defined in claim 4, wherein said subjecting includes applying a heat flow in one direction of flow resulting in the maximum change in a thickness of the clay mass, which is equivalent to a minimizing of an average heat conduction path and thus a maximizing of a speed of heating.

* * * * *